(12) United States Patent
Prichard et al.

(10) Patent No.: US 10,662,716 B2
(45) Date of Patent: May 26, 2020

(54) THIN-WALLED EARTH BORING TOOLS AND METHODS OF MAKING THE SAME

(71) Applicant: Kennametal Inc., Latrobe, PA (US)

(72) Inventors: Paul D. Prichard, Greensburg, PA (US); John Brosnahan, North Huntingdon, PA (US); Roger Stark, Jefferson Hills, PA (US)

(73) Assignee: KENNAMETAL INC., Latrobe, PA (US)

( * ) Notice: Subject to any disclaimer, the term of this patent is extended or adjusted under 35 U.S.C. 154(b) by 110 days.

(21) Appl. No.: 15/727,307

(22) Filed: Oct. 6, 2017

(65) Prior Publication Data

US 2019/0106941 A1    Apr. 11, 2019

(51) Int. Cl.
| | |
|---|---|
| *E21B 10/46* | (2006.01) |
| *B33Y 10/00* | (2015.01) |
| *C22C 29/08* | (2006.01) |
| *E21B 10/08* | (2006.01) |
| *E21B 10/43* | (2006.01) |
| *B22F 5/00* | (2006.01) |
| *E21B 10/627* | (2006.01) |
| *B22F 3/105* | (2006.01) |
| *C04B 35/56* | (2006.01) |
| *E21B 10/50* | (2006.01) |
| *B33Y 80/00* | (2015.01) |

(52) U.S. Cl.
CPC ........... *E21B 10/46* (2013.01); *B22F 3/1055* (2013.01); *B22F 5/00* (2013.01); *B33Y 10/00* (2014.12); *C04B 35/5626* (2013.01); *C22C 29/08* (2013.01); *E21B 10/08* (2013.01); *E21B 10/43* (2013.01); *E21B 10/50* (2013.01); *E21B 10/627* (2013.01); *B22F 2005/001* (2013.01); *B33Y 80/00* (2014.12)

(58) Field of Classification Search
CPC ........... E21B 10/46; E21B 10/08; E21B 10/42
See application file for complete search history.

(56) References Cited

U.S. PATENT DOCUMENTS

| | | | |
|---|---|---|---|
| 2,884,227 A * | 4/1959 | Hjalsten | E21B 10/36 175/435 |
| 4,925,490 A | 5/1990 | Nagai | |
| 6,220,117 B1 | 4/2001 | Butcher | |

(Continued)

FOREIGN PATENT DOCUMENTS

| | | |
|---|---|---|
| CN | 106780724 A | 5/2017 |
| EP | 3409801 A1 | 12/2018 |

(Continued)

OTHER PUBLICATIONS

Tan et al. Kinesin-13s form rings around microtubules. JCB 175 (1):25, Oct. 9, 2006, Figure 4.

(Continued)

*Primary Examiner* — D. Andrews
(74) *Attorney, Agent, or Firm* — Larry R. Meenan

(57) ABSTRACT

Earth boring tools are described herein employing sintered cemented carbide compositions in conjunction with thin-walled architectures. In some embodiments, an earth boring tool comprises a drill bit comprising a cutting portion and a body portion, the body portion including a sintered cemented carbide shell having wall thickness of 5 percent to 25 percent of the drill bit diameter.

16 Claims, 6 Drawing Sheets

(56) References Cited

U.S. PATENT DOCUMENTS

| | | | |
|---|---|---|---|
| 6,353,771 B1 | 3/2002 | Southland | |
| 7,776,256 B2* | 8/2010 | Smith | B22F 7/062 |
| | | | 419/10 |
| 7,832,456 B2 | 11/2010 | Calnan | |
| 7,832,457 B2 | 11/2010 | Calnan | |
| 8,007,714 B2 | 8/2011 | Mirchandani | |
| 8,459,380 B2 | 6/2013 | Mirchandani | |
| 9,393,674 B2 | 7/2016 | Keshavan | |
| 9,435,211 B2 | 9/2016 | Xu | |
| 2002/0023635 A1* | 2/2002 | Veik | B21D 22/16 |
| | | | 125/36 |
| 2003/0034177 A1 | 2/2003 | Chitwood | |
| 2004/0134309 A1 | 7/2004 | Liu | |
| 2007/0277651 A1 | 12/2007 | Calnan | |
| 2009/0301789 A1* | 12/2009 | Smith | B22F 3/1017 |
| | | | 175/374 |
| 2010/0193254 A1 | 8/2010 | Lind | |
| 2011/0030440 A1 | 2/2011 | Keane | |
| 2012/0040183 A1* | 2/2012 | Kelkar | B22F 3/1035 |
| | | | 428/367 |
| 2012/0247840 A1* | 10/2012 | Vempati | E21B 10/43 |
| | | | 175/428 |
| 2012/0292053 A1 | 11/2012 | Xu | |
| 2013/0048271 A1 | 2/2013 | VanLue | |
| 2013/0068539 A1* | 3/2013 | Vempati | E21B 10/5735 |
| | | | 175/434 |
| 2013/0303356 A1 | 11/2013 | Smith | |
| 2013/0313403 A1 | 11/2013 | Atkins | |
| 2013/0316149 A1 | 11/2013 | Atkins | |
| 2013/0320598 A1 | 12/2013 | Atkins | |
| 2013/0333950 A1 | 12/2013 | Atkins | |
| 2014/0087210 A1 | 3/2014 | Keane | |
| 2014/0298728 A1 | 10/2014 | Keshavan | |
| 2015/0129316 A1 | 5/2015 | Harrington | |
| 2015/0354284 A1 | 12/2015 | Griffo | |
| 2016/0039006 A1 | 2/2016 | Amstutz | |
| 2016/0053550 A1 | 2/2016 | Wilson | |
| 2016/0076342 A1 | 3/2016 | Silva | |
| 2016/0082667 A1 | 3/2016 | Donderici | |
| 2016/0084083 A1 | 3/2016 | Hice | |
| 2016/0138343 A1 | 5/2016 | Collins | |
| 2016/0138362 A1 | 5/2016 | Dockweiler | |
| 2016/0177637 A1 | 6/2016 | Fleckenstein | |
| 2016/0185009 A1 | 6/2016 | Keshavan | |
| 2016/0201425 A1 | 7/2016 | Walton | |
| 2016/0207109 A1 | 7/2016 | Buller | |
| 2016/0258223 A1 | 9/2016 | Uhlenberg | |
| 2016/0258242 A1 | 9/2016 | Steven | |
| 2016/0258298 A1 | 9/2016 | Channel | |
| 2016/0288200 A1 | 10/2016 | Xu | |
| 2016/0312567 A1 | 10/2016 | Murphree | |
| 2016/0325348 A1 | 11/2016 | Ownby | |
| 2016/0332236 A1 | 11/2016 | Stoyanov | |
| 2016/0375493 A1 | 12/2016 | Stoyanov | |
| 2017/0037518 A1 | 2/2017 | Oxford | |
| 2017/0050241 A1 | 2/2017 | Thomas | |
| 2017/0072465 A1 | 3/2017 | Welch | |
| 2017/0087622 A1 | 3/2017 | Cook, III | |
| 2017/0100771 A1 | 4/2017 | Voglewede | |
| 2017/0101835 A1 | 4/2017 | Webster | |
| 2017/0101836 A1 | 4/2017 | Webster | |
| 2017/0107764 A1 | 4/2017 | Cook, III | |
| 2017/0342779 A1* | 11/2017 | Cook, III | E21B 10/42 |
| 2018/0236687 A1* | 8/2018 | Prichard | C04B 35/5626 |

FOREIGN PATENT DOCUMENTS

| | | |
|---|---|---|
| WO | WO2007127899 A2 | 11/2007 |
| WO | WO2011008439 A2 | 1/2011 |
| WO | WO2011149401 A1 | 12/2011 |
| WO | WO2015162206 A2 | 10/2015 |
| WO | WO2016056934 | 4/2016 |
| WO | WO2016076853 | 5/2016 |
| WO | WO2016085452 | 6/2016 |
| WO | WO2016112169 | 7/2016 |
| WO | WO2016176221 | 11/2016 |
| WO | WO2017011825 | 1/2017 |
| WO | WO2017039619 | 3/2017 |
| WO | WO2017069744 | 4/2017 |

OTHER PUBLICATIONS

Oct. 10,2019 Non-Final OA.
Aug. 22, 2019 Advisory Action Received.
Aug. 13, 2019 Non-Final OA.
May 6, 2019 Final OA.
Dec. 17, 2018 Non-Final OA.
Jun. 25, 2018 Advisory Action Received .
May 31, 2018 International Search Report Transmitted.
Apr. 4, 2018 Final Office Action 2.
Nov. 13, 2017 Office action (3 months) 2.
Aug. 22, 2017 Advisory Action (PTOL-303) 1.
Apr. 4, 2017 Final Office Action.
Nov. 28, 2016 Office action (3 months) 1.
Wu et al., "Minimum Compliance Topology Optimization of Shell-Infill Composites for Additive Manufacturing", Computer Methods in Applied Mechanics and Engineering, 2017.
Kruth et al., "Consolidation phenomena in laser and powder-bed based layered manufacturing", CIRP Annals-Manufacturing Technology, 56 (2007), p. 730-759.
Clausen et al., "Exploiting Additive Manufacturing Infill in Topology Optimization for Improved Buckling Load", Engineering, 2 (2016), p. 250-257.
Belter et al, "Strengthening of 3D Printed Fused Deposition Manufactured Parts Using the Fill Compositing Technique", PLOS One, 2015.
Feb. 21, 2020 Non-Final OA.
Jan. 30, 2020 Final OA.
Jan. 16, 2020 Foreign OA.
Dec. 24, 2019 Exam Notice.

* cited by examiner

THIN-WALLED EARTH BORING TOOLS AND METHODS OF MAKING THE SAME

FIELD

The present invention relates to earth-boring tools and, in particular, to drill bits comprising thin-walled architectures.

BACKGROUND

Earth boring tools for oil and gas exploration are typically produced by machining a graphite mold and filling the mold with tungsten carbide (WC) powder. A lower melting point alloy (often copper-based) is placed on top of the WC powder as an infiltrant metal binder. The mold is placed into a vacuum furnace which melts the infiltrant to fill the void space between the WC particles by capillary force, thereby binding the WC particles together and creating a hard metal reinforced composite structure in the shape of an earth boring tool. This process is limited to coarse grain tungsten carbide with a limited volume fraction (up to 60 volume percent) and low melting point infiltrants. The Cu-based infiltrated WC materials have inferior mechanical and wear properties relative to WC—Co grades, which have with finer grain size, higher volume WC content and much stronger cobalt, nickel or iron metal binders. The current technology of graphite mold machining, core inserts and infiltration process is a time consuming and expensive process with geometric limitation. In addition, the solid carbide structure uses excessive amount of WC, which results in an increased weight of the boring tool.

SUMMARY

In one aspect, earth boring tools are described herein employing sintered cemented carbide compositions in conjunction with thin-walled architectures. Briefly, an earth boring tool comprises a drill bit comprising a cutting portion and a body portion, the body portion including a sintered cemented carbide shell having wall thickness of 5 percent to 25 percent of the drill bit diameter. In some embodiments, the sintered cemented carbide shell has thickness of 10 percent to 20 percent of the drill bit diameter.

In another aspect, methods of making earth boring tools are provided. In some embodiments, a method of making a drill bit of an earth boring tool comprises consolidating a grade powder into the drill bit via an additive manufacturing technique, the drill bit comprising a cutting portion and a body portion, the body portion including a sintered cemented carbide shell having wall thickness of 5 percent to 25 percent of drill bit diameter. The grade powder can comprise metal carbide and metallic binder. In some embodiments, the grade powder comprises sintered cemented carbide particles.

These and other embodiments are described further in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Earth Boring Tools

Figure 1:
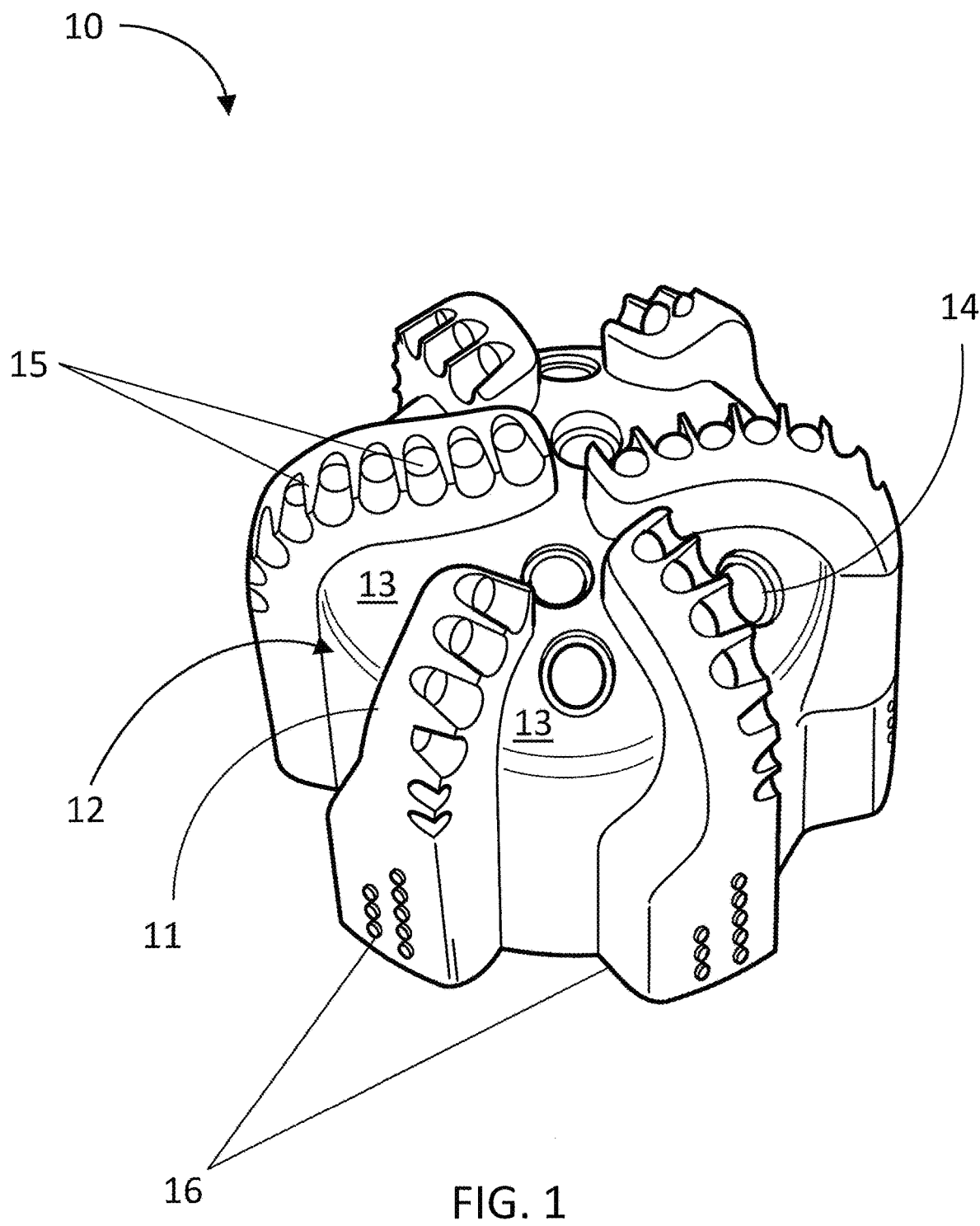
FIG. 1 is a drill bit of an earth boring tool according to some embodiments described herein.
Figure 2:
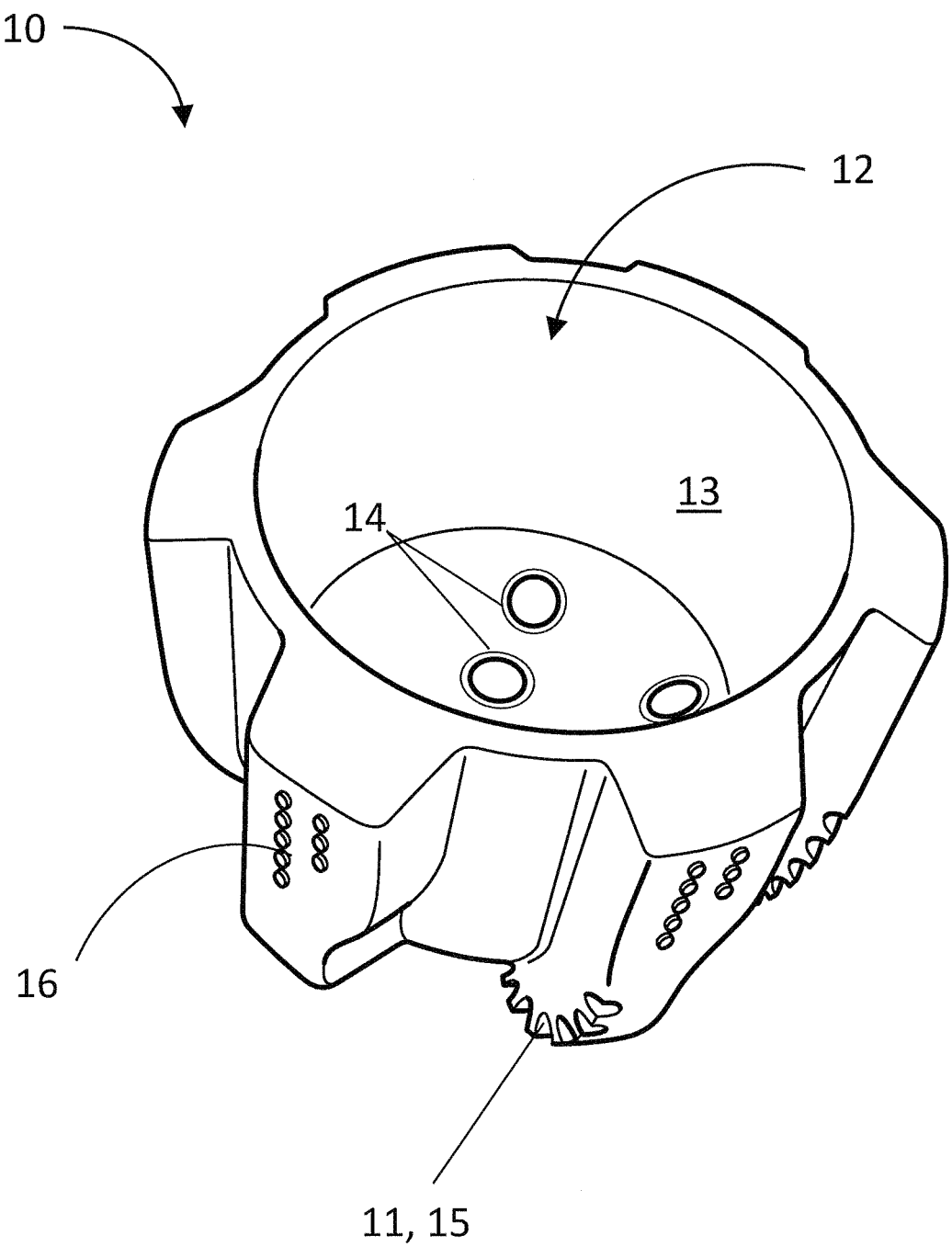
FIG. 2 is a perspective view of the interior of the sintered carbide shell of the drill bit of FIG. 1.

Earth boring tools are described herein employing sintered cemented carbide compositions in conjunction with thin-walled architectures. In some embodiments, an earth boring tool comprises a drill bit comprising a cutting portion and a body portion, the body portion including a sintered cemented carbide shell having wall thickness of 5 percent to 25 percent of the drill bit diameter. Drill bit diameter is defined by the largest diameter across the cutting elements, which produces a hole diameter in the earth. FIG. 1 illustrates a fixed cutter drill bit having a thin-walled sintered cemented carbide shell produced according to methods described herein. The drill bit 10 comprises a plurality of fixed cutting blades 11 forming the cutting portion of the drill bit 10. The cutting blades 11 comprise a plurality of pockets 15 for receiving cutting inserts. A body portion 12 supports the cutting blades 11 and comprises a sintered cemented carbide shell 13. FIG. 2 is a perspective view of the interior of the sintered cemented carbide shell 13. As illustrated in FIGS. 1 and 2, the sintered cemented carbide shell 13 includes apertures 14 for passing fluids, such as mud or slurry, to the cutting blades. The apertures 14 can be positioned adjacent the cutting blades 11 for delivery of fluid to cutting inserts (not shown) positioned in pockets 15 of the cutting blades 11. In some embodiments, the apertures 14 are part of one or more nozzle structures. Moreover, the hollow interior of the shell 13 can act as a reservoir for mud and/or other fluids for delivery through the apertures 14. The drill bit also comprises gage pads 16 adjacent to the sintered cemented carbide shell 13 and having a radial arrangement commensurate with the fixed cutting blades 11. While fixed cutting blades are shown in FIGS. 1 and 2, drill bits described herein also contemplate a cutting portion comprising roller cones.

The sintered cemented carbide shell can have wall thickness of 5 to 25 percent of the drill bit diameter. In some embodiments, wall thickness of the sintered cemented carbide shell can be selected from Table I.

TABLE I

| Wall Thickness of Sintered Cemented Carbide Shell % of Drill Bit Diameter |
|---|
| 5-25 |
| 5-20 |
| 5-15 |

TABLE I-continued

Wall Thickness of Sintered Cemented Carbide Shell
% of Drill Bit Diameter 5-10
10-25
10-20
15-25
15-20

In some embodiments, the sintered cemented carbide shell has uniform wall thickness or substantially uniform wall thickness having a value selected from Table I. In being substantially uniform, wall thickness varies less than 10 percent over the sintered cemented carbide shell. In other embodiments, the sintered cemented carbide shell exhibits variable wall thickness. The sintered cemented carbide shell, for example, can exhibit variable thickness in vertical and/or radial dimension(s). In exhibiting variable thickness, one or more regions of the sintered cemented carbide shell can have wall thickness selected from Table I while other regions can have wall thickness values outside the parameters of Table I. In some embodiments, wall thickness is increased in areas of the sintered cemented carbide shell experiencing high stress and/or wear during operation of the drill bit. Such areas include impact areas and attachment points of the drill bit to an alloy or steel body of the earth boring apparatus.

The drill bit can have any desired diameter for earth boring applications. In some embodiments, the drill bit has a diameter to 100 mm to 300 mm. In particular, the drill bit can have a diameter selected from Table II.

TABLE II

Drill Bit Diameter (mm)

100
150
200
250
300
<100
>300

As described herein, the shell of the drill bit comprises sintered cemented carbide. The sintered cemented carbide comprises metal carbide grains and metallic binder. Metallic binder, such as cobalt, nickel, iron or alloys thereof, can be present in the sintered cemented carbide of the shell in amounts of 0.5 to 30 weight percent.

Moreover, suitable metal carbide grains include one or more transition metals selected from Groups IVB-VIB of the Periodic Table. In some embodiments, for example, metal carbide grains comprise tungsten carbide. Tungsten carbide can be present in the sintered cemented carbide in an amount of at least 80 weight percent or at least 90 weight percent. In some embodiments, the tungsten carbide is the sole metal carbide of the sintered cemented carbide article. Alternatively, metal carbide can include carbides of one or more of niobium, vanadium, tantalum, chromium, zirconium and/or hafnium in addition to tungsten carbide. Metal carbide grains of the sintered cemented carbide article can have any size not inconsistent with the objectives of the present invention. Metal carbide grains, for example, can have an average size of 0.5 µm to 50 µm.

In some embodiments, metal carbide particles employed in shell fabrication are sintered cemented carbide particles. As detailed further herein, an individual sintered cemented carbide particle comprises multiple metal carbide grains sintered together in conjunction with metallic binder. In the loose condition, the sintered cemented carbide particles can have apparent density of at least 6 g/cm$^3$, in some embodiments. As known to one of skill in the art, apparent density is the mass of a unit volume of powder or particles in the loose condition, usually expressed in g/cm$^3$. In some embodiments, sintered cemented carbide particles have apparent density of at least 7 g/cm$^3$. Apparent density of sintered cemented carbide particles of grade powders described herein can also have values selected from Table III.

TABLE III

Apparent Density of Sintered Cemented Carbide Particles

≥6.5 g/cm$^3$
≥7.5 g/cm$^3$
≥8 g/cm$^3$
≥9 g/cm$^3$
6-11 g/cm$^3$
7-11 g/cm$^3$
8-11 g/cm$^3$

Apparent density of sintered cemented carbide particles of grade powders can also be less than 6 g/cm$^3$. For example, apparent density of sintered cemented carbide particles can range from 2-6 g/cm$^3$, in some embodiments. Apparent density of sintered cemented particles can be determined according to ASTM B212 Standard Test Method for Apparent Density of Free-Flowing Metal Powders using the Hall Flowmeter Funnel.

In addition to apparent density, sintered cemented carbide particles employed in shell fabrication can have tap density of at least 7 g/cm$^3$. In some embodiments, sintered cemented carbide particles exhibit tap density having a value selected from Table IV.

TABLE IV

Tap Density of Sintered Cemented Carbide Particles

≥7.5 g/cm$^3$
≥8 g/cm$^3$
≥8.5 g/cm$^3$
≥9.5 g/cm$^3$
7-12 g/cm$^3$
8-12 g/cm$^3$
9-12 g/cm$^3$

Tap density of sintered cemented carbide particles can be determined according to ASTM B527 Standard Test Method for Tap Density of Metal Powders and Compounds. In some embodiments, the ratio of tap density to apparent density (Hausner ratio) of sintered cemented carbide particles is 1.05 to 1.50. Hausner ratio of sintered cemented carbide particles, in some embodiments is 1.1 to less than 1.50.

In addition to apparent density and tap density, sintered cemented carbide particles can have an average individual particle density of at least 80 percent theoretical density. In some embodiments, average individual particle density of the sintered cemented carbide particles is at least 90 percent or at least 95 percent theoretical density. Sintered cemented carbide particles can exhibit an average individual particle density of 80 to 95 percent theoretical density, in some embodiments. In further embodiments, sintered cemented carbide particles can exhibit an average individual particle density of 90 to 98 percent theoretical density.

As described further herein, the foregoing apparent densities, tap densities and individual particle densities can be achieved through one or several sintering processes administered during formation of the particles. The sintering processes, in some embodiments, do not employ sintering inhibitor(s) to mitigate particle sticking or adhesion. Sintered cemented carbide particle properties described herein can be achieved in the absence of sintering inhibitor(s). In some embodiments, sintered cemented carbide particles are prepared by sintering a grade powder at temperatures of 1100° C. to 1400° C. for 0.5 to 2 hours to provide a sintered compact. The sintered compact is subsequently milled to provide individual sintered cemented carbide particles. Depending on particle morphology and density, the sintered cemented carbide particles can be further heat treated for further densification. Further heat treatment can include plasma densification, such as plasma spheroidization using an RF plasma torch or DC plasma torch. Alternatively, the sintered cemented carbide particles can be re-sintered forming a second compact. The second compact is milled to provide the sintered cemented carbide particles. Further densification treatments can be administered any desired number of times to provide sintered cemented carbide particles desired apparent densities, tap densities and/or individual particle densities. Sintering times and temperatures can be selected according to several considerations including, but not limited to, binder content of the cemented carbide particles, desired sintered particle density and sintering stage. In some embodiments, early sintering stages are conducted at lower temperatures and/or shorter times to facilitate milling the sintered compact. For example, an initial or early stage sintering process may be administered at temperatures below binder liquefaction. Late stage or final sintering processes may achieve higher temperatures, such as temperatures at which liquid phase sintering takes place.

Alternatively, sintered cemented carbide particles have been developed for unrelated applications, such as thermal spray and other cladding applications. In some embodiments, sintered cemented carbide particles commercially available for these unrelated applications may be employed in the sintered cemented carbide shell of drill bits described herein. Sintered cemented carbide particles developed for thermal spray/cladding applications, for example, are commercially available from Global Tungsten and Powders Corporation under the Powder Perfect trade designation.

Figure 3A:
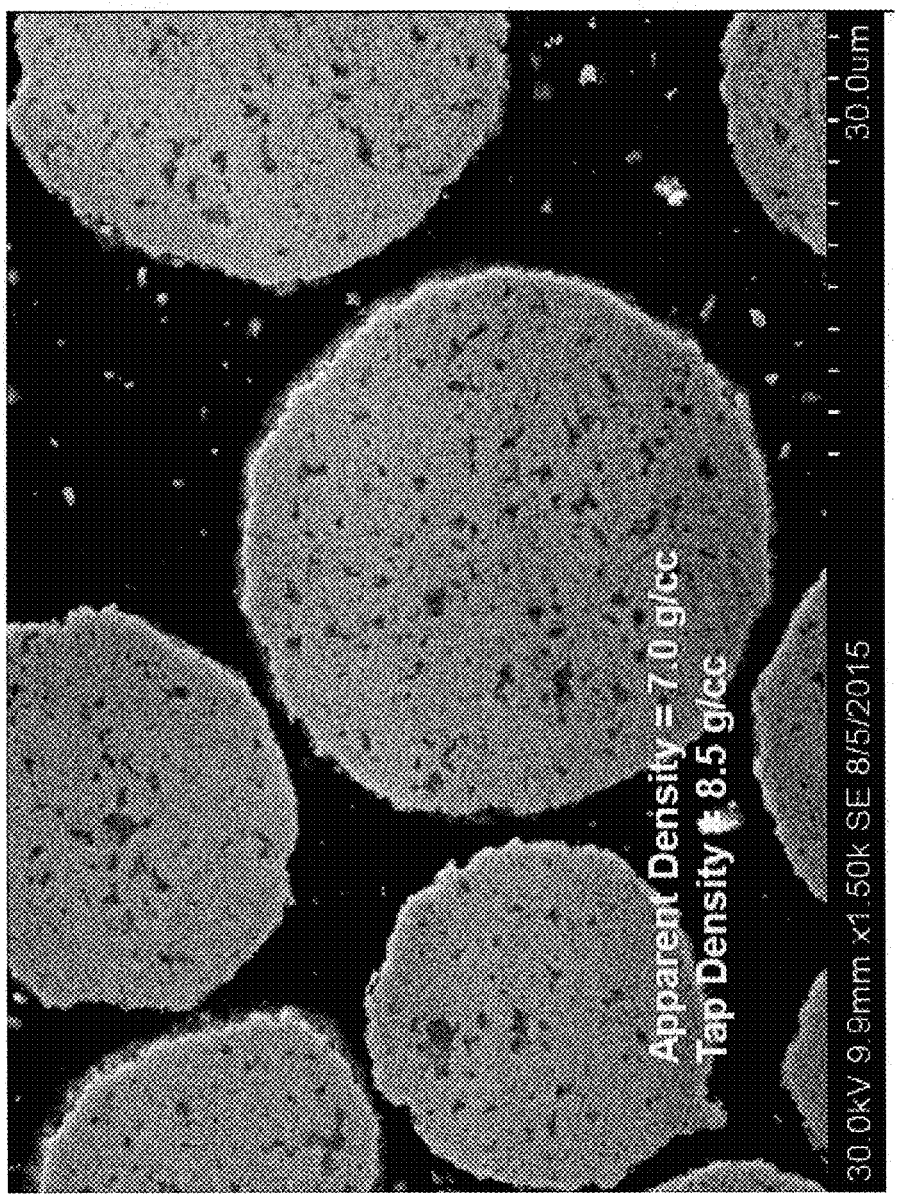
FIG. 3A is an SEM image of sintered cemented carbide particles according to some embodiments described herein.
Figure 3B:
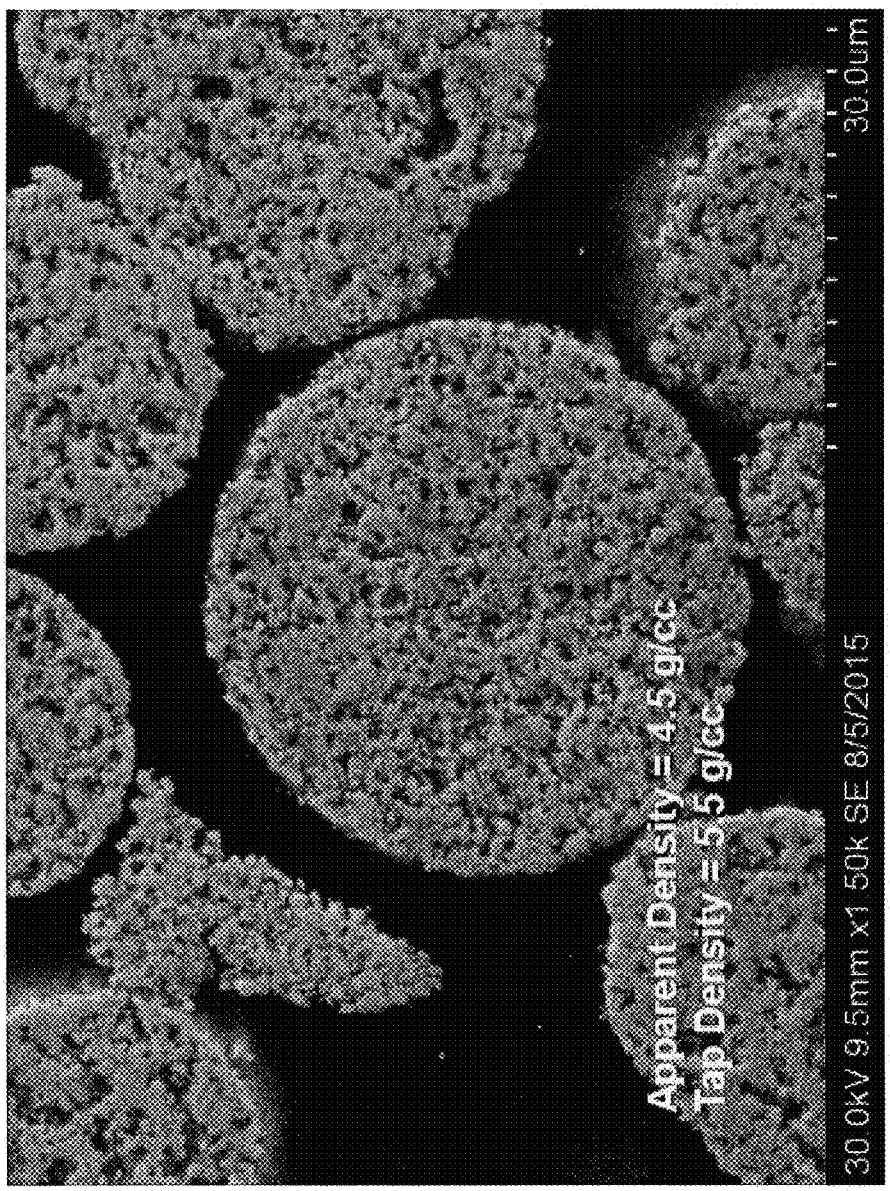
FIG. 3B is an SEM image of comparative sintered cemented carbide particles.

FIG. 3A is an SEM image of sintered cemented carbide particles prior to consolidation into the shell of the drill bit. Two sintering processes have been administered to the cemented carbide particles resulting in an apparent density of 7 g/cm$^3$ and tap density of 8.5 g/cm$^3$. For comparative purposes, FIG. 3B is an SEM image of sintered cemented carbide particles having apparent density of 4.5 g/cm$^3$ and tap density of 5.5 g/cm$^3$. As illustrated in FIG. 3B, the sintered cemented carbide particles exhibit substantially higher porosity, thereby inducing low individual particle density.

Sintered cemented carbide particles can generally have an average size of 1 μm to 100 μm. In some embodiments, sintered cemented carbide particles have an average size selected from Table V.

TABLE V

Average Sintered Cemented Carbide Particle Size (μm)

5-90
5-50

TABLE V-continued

Average Sintered Cemented Carbide Particle Size (μm)

10-75
10-50
5-40
20-40
0.5-2
1-5
1-10

Sintered cemented carbide particles can exhibit a Gaussian particle size distribution, in some embodiments. In other embodiments, sintered cemented carbide particles can have a polydisperse, bimodal or multi-modal particle size distribution. In further embodiments, sintered cemented carbide particles can be monodisperse or substantially monodisperse. In being substantially monodisperse, the cemented carbide particles are within ±10 percent or ±5 of the average particle size. In some embodiments, sintered cemented carbide particles are spherical or substantially spherical in shape. Alternatively, sintered cemented carbide particles can be a mixture of irregularly shaped particles with spherical or substantially spherical particles.

Sintered cemented carbide particles comprise one or more metal carbides selected from the group consisting of Group IVB metal carbides, Group VB metal carbides and Group VIB metal carbides. In some embodiments, tungsten carbide is the sole metal carbide of the sintered particles. In other embodiments, one or more Group IVB, Group VB and/or Group VIB metal carbides are combined with tungsten carbide to provide individual sintered particles. For example, chromium carbide, titanium carbide, vanadium carbide, tantalum carbide, niobium carbide, zirconium carbide and/or hafnium carbide and/or solid solutions thereof can be combined with tungsten carbide in sintered particle production. Tungsten carbide can generally be present in the sintered particles in an amount of at least about 80 or 85 weight percent. In some embodiments, Group IVB, VB and/or VIB metal carbides other than tungsten carbide are present in the sintered particles in an amount of 0.1 to 5 weight percent.

Sintered cemented carbide particles comprise metallic binder. Metallic binder of sintered cemented carbide particles can be selected from the group consisting of cobalt, nickel and iron and alloys thereof. In some embodiments, metallic binder is present in the sintered cemented carbide particles in an amount of 0.1 to 35 weight percent. Metallic binder can also be present in the sintered cemented carbide particles in an amount selected from Table VI.

TABLE VI

Metallic Binder Content (wt. %)

0.1-20
0.1-10
0.5-15
1-10
3-20
5-15
12-15
10-35
15-35
15-25

Metallic binder of the sintered cemented carbide particles can also comprise one or more additives, such as noble metal additives. In some embodiments, the metallic binder can comprise an additive selected from the group consisting of platinum, palladium, rhenium, rhodium and ruthenium and alloys thereof. In other embodiments, an additive to the metallic binder can comprise molybdenum, silicon or combinations thereof. Additive can be present in the metallic binder in any amount not inconsistent with the objectives of the present invention. For example, additive(s) can be present in the metallic binder in an amount of 0.1 to 10 weight percent of the sintered cemented carbide particles.

The drill bit shell can exhibit less than 5 volume percent porosity or less than 3 volume percent porosity, in some embodiments. Particle composition, particle size and metallic binder content of the sintered cemented carbide composition forming the drill bit shell can be varied according to several considerations including desired toughness and wear resistance. In some embodiments, the sintered cemented carbide is uniform throughout the shell. Alternatively, the sintered cemented carbide may exhibit one or more gradients over one or more dimensions of the shell. In some embodiments, the sintered cemented carbide exhibits a particle size and/or metallic binder gradient over one or more dimensions of the shell. For example, particle size and/or metallic binder content of the sintered cemented carbide may decrease in regions of the shell experiencing high wear. In other embodiments, particle size and/or binder content of the sintered cemented carbide may increase in regions of the shell receiving impacts or requiring toughness enhancements. Compositional gradients of the sintered cemented carbide can be combined with wall thickness variations described herein to provide the shell with the desired properties.

Figure 4:
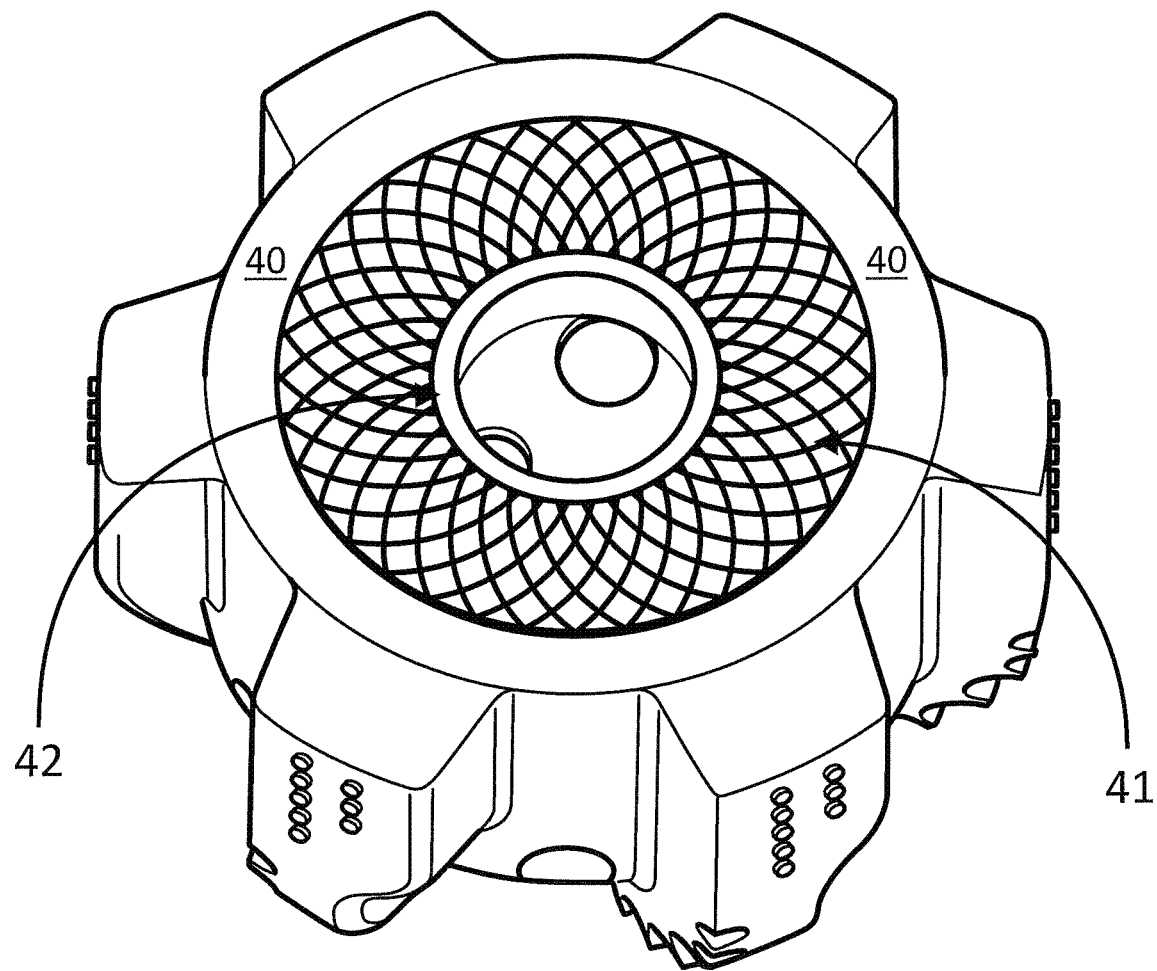
FIG. 4 illustrates lattice structures coupled to the sintered cemented carbide shell of a drill bit according to some embodiments.
Figure 5:
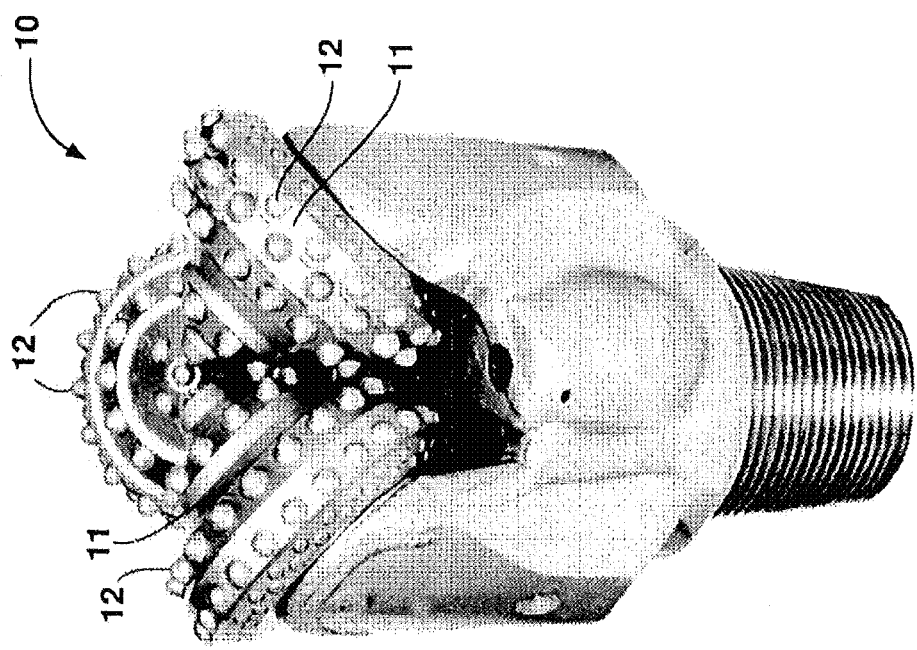
FIG. 5 illustrates a perspective view of a rotary cone earth boring bit 10 comprising roller cone blades 11 including cutting inserts 12.

In some embodiments, one or more lattice structures are coupled to the sintered cemented carbide shell of the drill bit. Lattice structures can have any design, features and/or arrangement for providing structural enhancement to the sintered cemented carbide shell. In some embodiments, one or more lattice structures can span the inner diameter of the sintered cemented carbide shell. In other embodiments, a support ring can be positioned with the shell, wherein lattice structures extend between the support ring and inner wall of the shell. The support ring can have any desired cross-sectional shape including circular, elliptical or polygonal. Additionally, the lattice structures can have any configuration including straight, curved and/or curvilinear segments extending between the support ring an inner wall of the shell. FIG. 4 illustrates a support ring and associated lattice structures according to some embodiments. As illustrated in FIG. 4, a curvilinear lattice 41 extends between the inner wall of the shell 40 and support ring 42.

In some embodiments, the sintered cemented carbide shell further comprises one or more rib structures on the inner wall of the shell. A rib structure can form a continuous ring along the inner wall of the shell. In other embodiments, rib structures can be discontinuous along the inner wall of the shell. For example, rib structures can be placed at various intervals or locations along the inner wall of the shell. In some embodiments, rib structures are placed along the inner wall at locations between the gage pads. Lattice and/or rib structures can be formed of any material not inconsistent with the objectives of the present invention. In some embodiments, lattice and/or rib structures are formed of sintered cemented carbide. The sintered cemented carbide of the lattice and/or rib structures can have any compositional parameters, properties and/or features described herein.

The interior surface of the sintered cemented carbide shell may also comprise threads for engaging a metal or alloy body, such as a drill column or boring head. In some embodiments, the threads are formed of sintered cemented carbide. The sintered carbide shell of the drill bit can be attached to a metal or alloy body by reverse threads, brazing, shrink-fit and/or other mechanical means including bolts, screws and/or common fasteners.

Referring once again to FIG. 1, the cutting blades 11 comprise a plurality of pockets 15 for receiving cutting inserts. In some embodiments, the pockets 15 comprise one or more structural features for mechanically engaging the cutting inserts. Structural elements can be selected from the group consisting of threads, slots, flanges, tapered pocket diameter and combinations thereof. Mechanical engagement of cutting inserts can facilitate replacement of worn inserts with new inserts. The cutting inserts may include polycrystalline diamond (PCD) inserts, tungsten carbide inserts, tungsten carbide inserts having a super-abrasive surface, such as natural or synthetic diamond, polycrystalline diamond, polycrystalline cubic boron nitride (PCBN), or inserts constructed of a matrix of tungsten carbide and other materials, or any combination thereof.

II. Methods of Making Earth Boring Tools

In another aspect, methods of making earth boring tools are provided. In some embodiments, a method of making a drill bit of an earth boring tool comprises consolidating a grade powder into the drill bit via an additive manufacturing technique, the drill bit comprising a cutting portion and a body portion, the body portion including a sintered cemented carbide shell having wall thickness of 5 percent to 25 percent of drillhead diameter. The grade powder can comprise metal carbide and metallic binder. In some embodiments, the grade powder comprises sintered cemented carbide particles having composition and properties described in Section I hereinabove.

As described herein, the grade powder is consolidated into the drill bit by one or more additive manufacturing techniques. Any additive manufacturing technique operable to form the grade powder into the drill bit can be employed. The grade powder, for example, can be consolidated into the drill bit via laser sintering according to an electronic file detailing the design parameters of the drill bit. In some embodiments, the grade powder is consolidated into a green drill bit and subsequently sintered. For example, binder jetting can provide a green drill bit formed of grade powder. In the binder jetting process, an electronic file detailing the design parameters of the drill bit is provided. The binder jetting apparatus spreads a layer of grade powder in a build box. A printhead moves over the powder layer depositing liquid binder according to design parameters for that layer. The layer is dried, and the build box is lowered. A new layer of grade powder is spread, and the process is repeated until the green article is completed. In some embodiments, other 3D printing apparatus can be used to construct the green article from the grade powder in conjunction with organic binder.

Any organic binder not inconsistent with the objectives of the present invention can be employed in formation of the green drill bit by one or more additive manufacturing techniques. In some embodiments, organic binder comprises one or more polymeric materials, such as polyvinylpyrrolidone (PVP), polyethylene glycol (PEG) or mixtures thereof. Organic binder, in some embodiments, is curable which can enhance strength of the green article. The green drill bit, for example, can exhibit compressive strength of at least 10 MPa. In some embodiments, compressive strength of the green drill bit is in the range of 10-20 MPa. Compressive strength of the green article is determined according to ASTM E9 Standard Test Method of Compression Testing of Metallic Materials at Room Temperature.

In some embodiments, a green or brown drill bit can be formed by selective laser sintering. The selective laser sintering conditions are chosen to provide the green or brown drill bit with low density. The green or brown drill bit is then sintered to full density or near full density as described below.

Green drill bits formed from grade powder compositions described herein can be sintered under conditions and for time periods to provide sintered articles having the desired density. The green article can be vacuum sintered or sintered under a hydrogen or argon atmosphere at temperatures of 1300° C. to 1560° C. Moreover, sintering times can generally range from 10 minutes to 5 hours. In some embodiments, hot isostatic pressing (HIP) is added to the sintering process. Hot isostatic pressing can be administered as a post-sinter operation or during vacuum sintering. Hot isostatic pressing can be administered for up to 2 hours at pressures of 1 MPa to 300 MPa and temperatures of 1300° C. to 1560° C. Sintered drill bits described herein can exhibit densities greater than 98% theoretical full density. Density of a sintered drill bit can be at least 99% theoretical full density. Moreover, microstructure of the sintered drill bit can be uniform, in some embodiments. Non-stoichiometric metal carbides, such as eta phase, $W_2C$ and/or $W_3C$, may also be absent in the sintered articles. Alternatively, sintered cemented carbide drill bits can comprise non-stoichiometric metal carbide(s) in minor amounts (generally <5 wt. % or <1 wt. %). Moreover, a sintered drill bit described herein can have an average grain size less than 100 μm. In some embodiments, for example, a sintered drill bit has an average grain size of 1-50 μm or 10-40 μm.

In some embodiments, a sintered drill bit produced according to methods described herein exhibits less than 25 percent shrinkage or less than 20 percent shrinkage in one or more dimensions relative to the green form. Linear shrinkage of the sintered drill bit in one more dimensions relative to the green article can also have a value selected from Table VII.

TABLE VII

Linear Shrinkage of Sintered Article

≤15%
≤10%
≤5%
5-25%
5-10%
1-10%
1-5%

Sintered drill bits produced according to methods described herein can have any composition, structure and/or properties described in Section I above, including thin-walled architecture. In some embodiments, the sintered cemented carbide shell of the drill bit has wall thickness selected from Table I above. These and other embodiments are further illustrated by the following non-limiting examples.

Example 1—Drill Bit

A drill bit having a thin-walled architecture of sintered cemented carbide was fabricated as follows. A 3D printing system generated a green drill bit in a layered process using iterative spreading of a WC-17% Co powder in a build box followed by application of PVP-PEG binder with poly glycol ether solvent according to the design of the product. Sintered cemented carbide particles (WC-17% Co) were loaded into a binder jet system such as an Innovent or M-Flex 3D printing system from ExOne of N. Huntingdon, Pa. A 3D digital model of the drill bit in a STL file format was selected for printing and the appropriate shrinkage factors were applied to account for the dimensional change during sintering. The 3D CAD model was deconstructed into 100 micron slices, and created printing patterns for each layer, which were reassembled in succeeding layers. The sintered cemented carbide particles were produced by a conventional spray drying process used for creating spherical agglomerates of WC—Co mixtures. The particle size distribution was in the range of D10 (10 μm) to D90 (45 μm). The critical powder attributes were developed by sintering to a high density (85% to 95%) as described hereinabove in Section I, which enables powder flowability, printability and reduce sintering shrinkage. The critical process parameters were binder saturation, print temperature and powder spreading speed. A binder saturation from 80% to 120%, print temperature ranges from 45° C. to 55° C. and the recoat speed ranges between 10 mm/sec and 20 mm/sec. The typical time to print a layer ranged from 45 seconds to 90 seconds, which translated into vertical a print rate of 4 mm/hr to 8 mm/hr. After printing, the green drill bit was cured in an air furnace at 200° C. to promote green strength. The green drill bit was removed from the powder job box and loose powder was removed by compressed air, vacuum and gently brushing it away. The thin wall WC-17Co drill bit was placed on a graphite tray and vacuum sinter/HIP at 1460-1500° C. for 0.5-1 hour and densified to 13.7 g/cm³ equaling 99.3% of theoretical density. The sintered drill bit exhibited hardness greater or equal to 85 HRA, and the microstructural analysis revealed no eta phase and the absence of exaggerated large grains. The sintered drill bit geometry substantially reproduced the printed article albeit at a smaller size commensurate with the applied shrinkage factors. The sintered drill bit is illustrated in FIGS. 1-2.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An earth boring tool comprising:
a drill bit comprising a cutting portion and a body portion, the body portion including a sintered cemented carbide shell having a wall thickness of 5 percent to 25 percent of the drill bit diameter, wherein the sintered cemented carbide shell comprises sintered cemented carbide particles, the sintered cemented carbide particles having an apparent density of 6-11 g/cm³ according to ASTM B212 in a loose condition prior to incorporation in the sintered cemented carbide shell.

2. The earth boring tool of claim 1, wherein the sintered cemented carbide shell has wall thickness of 10 percent to 20 percent of the drill bit diameter.

3. The earth boring tool of claim 1, wherein the drill bit diameter is 100 mm to 300 mm.

4. The earth boring tool of claim 1, wherein the sintered cemented carbide of the shell comprises 3 weight percent to 30 weight percent metallic binder.

5. The earth boring tool of claim 1, wherein the cutting portion comprises fixed cutting blades.

6. The earth boring tool of claim 1, wherein the cutting portion comprises roller cones.

7. The earth boring tool of claim 1, wherein the cutting portion comprises pockets for receiving cutting inserts.

8. The earth boring tool of claim 1 further comprising one or more lattice structures coupled to the sintered cemented carbide shell.

9. The earth boring tool of claim 8, wherein the lattice structures comprise sintered cemented carbide.

10. The earth boring tool of claim 9, wherein the sintered cemented carbide of the lattice structure differs from the sintered cemented carbide of the shell by one or more compositional or physical properties.

11. The earth boring tool of claim 8, wherein the wall thickness of the sintered cemented carbide shell is 5 percent to 10 percent of the drill bit diameter.

12. The earth boring tool of claim 8, wherein the lattice structures span an inner diameter of the sintered cemented carbide shell.

13. The earth boring tool of claim 8, wherein the lattice structures span between a support ring in an inner diameter of the sintered cemented carbide shell to an inner wall of the sintered cemented carbide shell.

14. The earth boring tool of claim 1, wherein the sintered cemented carbide shell defines a fluid reservoir.

15. The earth boring tool of claim 14 further comprising apertures for passing fluid from the fluid reservoir to the cutting portion.

16. The earth boring tool of claim 1, wherein the sintered cemented carbide shell has less than 3% porosity.

* * * * *